Patented July 4, 1939

2,165,034

UNITED STATES PATENT OFFICE 2,165,034

DISUBSTITUTED GUANIDINE SALTS OF METALLIFEROUS AZO DYES

Herbert W. Daudt and Chester W. Hannum, Wilmington, Del., assignors to E. I. du Pont de Nemours & Company, Wilmington, Del., a corporation of Delaware No Drawing. Application July 14, 1937, Serial No. 153,515

11 Claims. (Cl. 260—147)

This invention relates to di-substituted guanidine salts of metalized azo dyes.

U. S. Patent 1,674,128 to du Pont covers substituted guanidine salts of several classes of dyes. The products of that patent have many excellent properties among which is solubility in alcohol and similar common organic solvents, but they are somewhat lacking in fastness to light.

It is an object of this invention to produce azo dyes which are soluble in common organic solvents, which are of desirable shade, of excellent brightness, which have affinity for leather, wood, pyroxylin, and paper, and which are stable to light.

The objects of the invention are accomplished, generally speaking, by making and using di-substituted guanidine salts of metalliferous azo dyes having at least one water-solubilizing group, such as COOH or $SO_3H$ and having a metal in the range atomic weight 51.9 to 64.0, inclusive.

In the practice of the preferred form of the invention an azo dye, having a sulfonic or carboxylic acid substituent and having an hydroxy ortho to azo, and which may have hydroxy ortho to a carboxy group, and which may have hydroxy groups present in other positions, is metallized with copper or chromium, or with one of the other metals appearing in the range described, is dissolved in a substantially neutral aqueous solution, and is reacted with a di-substituted guanidine which is preferably a di-aryl guanidine, in which the dye used as a starting material must comprise a metalliferous product obtained by a previous introduction of the metal into an azo dye which contains hydroxy or carboxy groups in a position adjacent to an azo group or an hydroxy ortho to a carboxyl group, and must contain one or more like or unlike azo groups, and must contain one or more solubilizing groups such as sulfonic or carboxylic acid.

In addition to the metals which have been named nickel, cobalt, manganese, and iron are of particular value and their atomic weights lie in the above range. The preferred metals, chromium and copper, are members of groups 6 and 16, respectively, of the periodic system.

The metalliferous dyes are preferably used in the form of their neutral aqueous solutions. Alkaline solution will cause the separation of undue amounts of the di-substituted guanidine during the formation of the di-substituted guanidine salt.

The di-substituted guanidines may be of the aryl, alkyl, aralkyl, or cyclohexyl series. They may be symmetrical or unsymmetrical. The alkyl group preferably contains from 4 to 10 carbon atoms. They are usually used in the form of their neutral salts, such as the formate, acetate and hydrochloride. Other water soluble salts will usually suffice.

The preferred di-substituted guanidines are the diaryl guanidines, such as di-(ortho-tolyl)-guanidine, di-(para-phenetyl)guanidine, di-(ortho-anisyl)guanidine and di-xylyl guanidine.

The relative proportions of dye and substituted guanidine may vary over a wide range, depending upon the number of acid groups in the dye, the number of acidic groups to be reacted with the guanidine, and the degree of hydrolysis and solubility of the product. The amount of the guanidine salt should be at least equivalent to one acid group; preferably, an excess is used. It does not necessarily follow that an excess of the guanidine salt will cause a reaction to take place between the guanidine and all of the acidic groups ($SO_3H$, etc.).

The temperature conditions, under which the dye and the guanidine salt are mixed and the conditions subsequently imposed upon the mixture, have varied with the formation of different products. In some cases, excellent results have been obtained by conducting the mixing operation at 5–25° C. and subsequently filtering at the same temperature; in other cases, subsequent heating to 50–100° C. was necessary for the rapid filtration of the product.

The following examples illustrate the processes and the products, but are not limitative of the invention:

Example I

Twenty parts of a dye, consisting of a commercially available chromed complex of the azo combination, formed by the interaction of diazotized 1-amino-2-naphthol-4-sulfonic acid with 1-(4'-sulfo-phenyl)-3-methyl-5-pyrazolone, was dissolved in 400 parts of water; the solution was filtered. The filtered solution was stirred at room temperature while 100 parts of a 11% neutral solution of di-ortho-tolyl-guanidine-hydrochloride was added. A red precipitate formed immediately. The mass was heated to 60–65° C., cooled to 35° and then filtered. The residue was washed with a cold 1% solution of di-ortho-tolyl-guanidine and subsequently with a limited amount of water. The residue was dried at approximately 80° C.

The dried product was soluble in alcohol and in similar solvents. Its solutions were of a slightly bluish-red color. They were used for the dyeing and staining of paper, wood, and leather.

The dyed and stained materials were of a rich, bright bluish-red color. This dye, applied to these materials, was inappreciably affected by 53 hours of exposure to a fadometer. On the other hand, a number of commercial dyes, similarly applied and giving similar shades, were markedly affected by 8½ hours of the same exposure. These commercial dyes consisted of the di-ortho-tolyl-guanidine salts of non-metal azo dyes.

*Example II*

Seven parts of the coppered complex of the azo combination, prepared from two mols of diazotized anthranilic acid and one mol of Rhoduline acid, was dissolved in 450 parts of water, and the resulting solution filtered. The filtered solution was stirred and treated with 10 parts of a solution (11%) of di-ortho-tolyl-guanidine hydrochloride until no further precipitation of insoluble material could be observed. The precipitate was removed by filtration at room temperature. The residue was washed with a 1% di-ortho-tolyl-guanidine hydrochloride solution, and finally with a limited amount of water. It was then dried at room temperature.

The dried product consisted of dark violet lumps, which were ground to a powder. This product was then allowed to stand at room temperature. After several days it had solidified. It was then ground to a red powder.

This product was soluble in alcohol and in similar solvents, it forming red colored solutions. The solution in alcohol was used for the staining and dyeing of wood, paper, and leather. The dye, applied on the materials particularly on paper, was very fast to light. The dyeing on paper was only slightly influenced by 49 hours exposure to the fadometer; several commercial alcohol-soluble dyes were markedly affected in 7 hours of the same exposure.

Products, having the same general characteristics as the product of Example I, were obtained from the same water soluble dye and di-phenyl-guanidine-acetate. Similar products were obtained with the use of the hydrochloride of one or more of the following guanidines: di-(o-anisyl)-guanidine, di-(2-ethyl-hexyl)-guanidine, di-cyclohexyl-guanidine, di-benzyl-guanidine-N-phenyl-N'-butyl-guanidine.

Di-ortho-tolyl-guanidine salts of the following additional metalliferous azo dyes were prepared by procedures similar to those described in the preceding examples. The treatments, ending in the isolation of the products as well as the initial form of the products, vary. However, in all cases, alcohol soluble solids were finally obtained. All of these products showed excellent fastness to light.

| Ex. | Azo combination | Metal present | Color of dyeings |
|---|---|---|---|
| 4 | 1-amino-2-naphthol-4-sulfonic acid ⟶ 1-naphthol-8-sulfonic acid | Chromium | Blue. |
| 5 | 4-chloro-2-amino-phenol-6-sulfonic acid ⟶ 2:4-di-hydroxy-quinoline | do | Bordeaux. |
| 6 | Salicyclic acid ⟵ benzidine ⟶ resorcin ⟵ 2-amino-phenol-4-sulfonic acid. | Copper | Brown. |
| 7 | 6-chloro-2-amino-phenol-4-sulfonic acid ⟶ 1-(3-sulfo-phenyl)-3-methyl-5-phenyl-pyrazolone. | Chromium | Red. |
| 8 | 4-chloro-2-amino-phenol-6-sulfonic acid ⟶ 2-naphthol-3:6-disulfonic acid. | do | Violet. |
| 9 | 4-chloro-2-amino-benzoic acid ⟶ 2-naphthol-3:6-disulfonic acid | do | Do. |
| 10 | Anthranilic acid ⟶ 2-naphthol-3:6-disulfonic acid | do | Red. |
| 11 | (2-amino-benzoic-acid-4-sulfonic acid)₂ ⟶ rhoduline acid | do | Violet. |
| 12 | 6-nitro-1-amino-2-naphthol-4-sulfonic acid ⟶ beta naphthol | do | Black. |
| 13 | 2-amino-5-sulfo-benzoic acid ⟶ 1-(sulfo-phenyl)-3-methyl-5-pyrazolone. | do | Yellow. | powder was soluble in ethyl alcohol and in amyl alcohol. The solutions were violet colored.

This product was also used in the dyeing and staining of leather, paper, and wood. The treated materials were reddish-violet colored.

The dye was very fast to light. The influence of 56 hours exposure to a fadometer was very slight; on the other hand, 13 hours of similar exposure of a number of commercial dyes of similar type, that had been similarly applied, caused marked losses in strength.

*Example III*

The azo combination, prepared by diazotization of 4-chloro-2-amino-phenol-6-sulfonic acid and subsequent coupling to 1-(4'-sulfo-phenol)-3-methyl-5-pyrazolone, was converted to a chromium complex by the procedure described in Example No. I of U. S. P. 1,888,516. The product was isolated in the usual manner.

Six parts of the product was dissolved in 250 parts of water, and, after 0.5 part of acetic acid was added, the solution was filtered. The solution was cooled to 5° C. and to it were added 110 parts of an 11% aqueous solution of di-ortho-tolyl-guanidine hydrochloride. A tacky red substance separated. The supernatant solution was removed by decantation. The tacky product was washed several times with a very dilute solution of di-ortho-tolyl-guanidine hydrochloride. The The products of this invention are characterized by their fastness to light. When this property of these colors is compared with the corresponding property of the most practical commercial substituted-guanidine salts of non-metallic dyes giving the same shades, an improvement in light-fastness of five to eight times is observed. The dyes are sufficiently soluble in ordinary organic solvent such as alcohol and ethyl acetate and have fine affinity for the materials which we have named. The shades are good and their resistance to other destructive influences is satisfactory.

As many apparently widely different embodiments of this invention may be made without departing from the spirit and scope thereof, it is to be understood that we do not limit ourselves to the specific embodiments thereof except as defined in the appended claims.

We claim:

1. Guanidine (di-substituted from the class of radicals consisting of alkyl, aralkyl, aryl and cyclohexyl) salts of metalized azo dyes having at least one acid group from the class consisting of sulfonic and carboxy, and having a metal in the range atomic weight from 51.9 to 64.0, inclusive.

2. Di-aryl guanidine salts of metalized azo dyes having at least one acid group from the class consisting of sulfonic and carboxy, and a metal in the range atomic weight 51.9 to 64.0, inclusive.

3. Di-aryl guanidine salts of metalized azo dyes having at least one acid group from the class consisting of sulfonic and carboxy, and a metal from the group consisting of copper and chromium.

4. Di-ortho-tolyl guanidine salts of metalized azo dyes having at least one acid group from the class consisting of sulfonic and carboxy, and a metal in the range atomic weight 51.9 to 64.0, inclusive.

5. Di(alkoxy-phenyl) guanidine salts of metalized azo dyes having at least one acid group from the class consisting of sulfonic and carboxy, and a metal in the range atomic weight 51.9 to 64.0, inclusive.

6. Di-xylyl guanidine salts of metalized azo dyes having at least one acid group from the class consisting of sulfonic and carboxy, and a metal in the range atomic weight 51.9 to 64.0, inclusive.

7. Di-ortho-anisyl guanidine salts of metalized azo dyes having at least one acid group from the class consisting of sulfonic and carboxy, and a metal in the range atomic weight 51.9 to 64.0, inclusive.

8. The process which comprises dissolving a water-soluble metalized azo dye in neutral aqueous solution, adding thereto an aqueous solution of guanidine di-substituted from the class of radicals consisting of aryl, alkyl, aralkyl, and cyclohexyl, and isolating the product.

9. Diaryl-guanidine salts of chromiferous ortho-hydroxy-azo compounds, having at least one acid group from the class consisting of sulfonic and carboxy.

10. A di-ortho-tolyl-guanidine salt of the chromed dye formed by interacting diazotized 1-amino-2-naphthol-4-sulfonic acid and 1-(sulfophenyl)-3-methyl-5-pyrazolone.

11. The di-ortho-tolyl-guanidine salts of chromed complexes of ortho-hydroxy-azo dyes, having at least one water-solubilizing substituent.

HERBERT W. DAUDT.
CHESTER W. HANNUM.

Certificate of Correction

Patent No. 2,165,034.     July 4, 1939.

HERBERT W. DAUDT ET AL.

It is hereby certified that errors appear in the printed specification of the above numbered patent requiring correction as follows: Page 1, first column, line 23, after the word "hydroxy" insert *group*; page 2, in the table, second column thereof, line 11, for "———→" before "rhoduline acid" read ⇌; and that the said Letters Patent should be read with these corrections therein that the same may conform to the record of the case in the Patent Office.

Signed and sealed this 12th day of September, A. D. 1939.

[SEAL]

HENRY VAN ARSDALE,
*Acting Commissioner of Patents.* metal in the range atomic weight 51.9 to 64.0, inclusive.

3. Di-aryl guanidine salts of metalized azo dyes having at least one acid group from the class consisting of sulfonic and carboxy, and a metal from the group consisting of copper and chromium.

4. Di-ortho-tolyl guanidine salts of metalized azo dyes having at least one acid group from the class consisting of sulfonic and carboxy, and a metal in the range atomic weight 51.9 to 64.0, inclusive.

5. Di(alkoxy-phenyl) guanidine salts of metalized azo dyes having at least one acid group from the class consisting of sulfonic and carboxy, and a metal in the range atomic weight 51.9 to 64.0, inclusive.

6. Di-xylyl guanidine salts of metalized azo dyes having at least one acid group from the class consisting of sulfonic and carboxy, and a metal in the range atomic weight 51.9 to 64.0, inclusive.

7. Di-ortho-anisyl guanidine salts of metalized azo dyes having at least one acid group from the class consisting of sulfonic and carboxy, and a metal in the range atomic weight 51.9 to 64.0, inclusive.

8. The process which comprises dissolving a water-soluble metalized azo dye in neutral aqueous solution, adding thereto an aqueous solution of guanidine di-substituted from the class of radicals consisting of aryl, alkyl, aralkyl, and cyclohexyl, and isolating the product.

9. Diaryl-guanidine salts of chromiferous ortho-hydroxy-azo compounds, having at least one acid group from the class consisting of sulfonic and carboxy.

10. A di-ortho-tolyl-guanidine salt of the chromed dye formed by interacting diazotized 1-amino-2-naphthol-4-sulfonic acid and 1-(sulfophenyl)-3-methyl-5-pyrazolone.

11. The di-ortho-tolyl-guanidine salts of chromed complexes of ortho-hydroxy-azo dyes, having at least one water-solubilizing substituent.

HERBERT W. DAUDT.
CHESTER W. HANNUM.

Certificate of Correction

Patent No. 2,165,034. July 4, 1939.

HERBERT W. DAUDT ET AL.

It is hereby certified that errors appear in the printed specification of the above numbered patent requiring correction as follows: Page 1, first column, line 23, after the word "hydroxy" insert *group*; page 2, in the table, second column thereof, line 11, for "⸺→" before "rhoduline acid" read ⸺; and that the said Letters Patent should be read with these corrections therein that the same may conform to the record of the case in the Patent Office.

Signed and sealed this 12th day of September, A. D. 1939.

[SEAL]

HENRY VAN ARSDALE,
*Acting Commissioner of Patents.*